US012800530B2

(12) United States Patent
Aljarro et al.

(10) Patent No.: US 12,800,530 B2
(45) Date of Patent: Nov. 17, 2026

(54) PROBABILITY OF DETECTION OF LIFECYCLE PHASES OF CORROSION UNDER INSULATION USING ARTIFICIAL INTELLIGENCE AND TEMPORAL THERMOGRAPHY

(71) Applicants: Saudi Arabian Oil Company, Dhahran (SA); Baker Hughes Holdings LLC, Houston, TX (US)

(72) Inventors: Ahmed Aljarro, Dhahran (SA); Ali Al Shehri, Thuwal (SA); Ayman Amer, Thuwal (SA); Abdulrahman Althobaiti, Thuwal (SA); Hamad Saiari, Dhahran (SA); Fadhel Asfoor, Dhahran (SA); Yasser Alsubhi, Dhahran (SA); Rick Hunter, Houston, TX (US); Arjun Roy, Katy, TX (US); Vladimir Shapiro, Newton, MA (US); Weiwei Qian, Lexington, MA (US); Bilal Saad, Dhahran (SA); Matthias Odisio, Dallas, TX (US); Godine Kok Yan Chan, Natick, MA (US); Edvardas Kairiukstis, New Bedford, MA (US); Anthony Kakpovbia, Calgary (CA); Muntathir Albaqshi, Al Khobar (SA); Fatima Alsalman, Dhahran (SA)

(73) Assignees: Saudi Arabian Oil Company, Dhahran (SA); Baker Hughes Holdings LLC, Houston, TX (US)

( * ) Notice: Subject to any disclaimer, the term of this patent is extended or adjusted under 35 U.S.C. 154(b) by 529 days.

(21) Appl. No.: 18/365,612

(22) Filed: Aug. 4, 2023

(65) Prior Publication Data

US 2024/0053287 A1 Feb. 15, 2024

Related U.S. Application Data

(60) Provisional application No. 63/371,346, filed on Aug. 12, 2022.

(51) Int. Cl.
*G01N 25/72* (2006.01)
*G01J 5/48* (2022.01)
(Continued)

(52) U.S. Cl.
CPC ................ *G01N 25/72* (2013.01); *G01J 5/48* (2013.01); *G06T 5/50* (2013.01); *G06V 10/25* (2022.01);
(Continued)

(58) Field of Classification Search
None
See application file for complete search history.

(56) References Cited

U.S. PATENT DOCUMENTS

| | | | |
|---|---|---|---|
| 8,596,861 | B2 | 12/2013 | Kane et al. |
| 10,533,937 | B1 | 1/2020 | Shehri et al. |

(Continued)

FOREIGN PATENT DOCUMENTS

| | | | |
|---|---|---|---|
| WO | 2020123505 | A1 | 6/2020 |
| WO | 2021011729 | A1 | 1/2021 |

(Continued)

OTHER PUBLICATIONS

International Search Report and Written Opinion in the corresponding PCT Application No. PCT/US2023/029637 mailed Feb. 6, 2024; 14 pages.

(Continued)

*Primary Examiner* — Erica S Lin
(74) *Attorney, Agent, or Firm* — Leason Ellis LLP

(57) ABSTRACT

A system for determining corrosion under insulation of an industrial asset is provided. The system includes an infrared
(Continued)

camera configured to acquire one or more time-series infrared images of an industrial asset. The system further includes a computing device configured to receive data characterizing the one or more time-series infrared images, and to identify an area of interest of the industrial asset within the one or more time-series infrared images. The computing device further configured to identify, by a machine learning algorithm, a plurality of defects within the area of interest based on pixel-wise assignment of at least one defect category selected from a plurality of defect categories associated with corrosion under insulation of the industrial asset, and to provide the plurality of defects within the area of interest of the industrial asset. Related methods, apparatuses, and computer-readable mediums are also provided.

9 Claims, 13 Drawing Sheets

(51) Int. Cl.

| | |
|---|---|
| ***G06T 5/50*** | (2006.01) |
| ***G06V 10/25*** | (2022.01) |
| ***G06V 10/762*** | (2022.01) |
| ***G06V 20/70*** | (2022.01) |
| *G01J 5/00* | (2022.01) |

(52) U.S. Cl.

CPC ............ *G06V 10/762* (2022.01); *G06V 20/70* (2022.01); *G01J 2005/0077* (2013.01); *G06T 2207/20221* (2013.01); *G06V 2201/07* (2022.01)

(56) References Cited

U.S. PATENT DOCUMENTS

| | | | | |
|---|---|---|---|---|
| 10,620,115 | B2 | 4/2020 | Shehri | |
| 10,643,324 | B2 | 5/2020 | Al Shehri | |
| 10,768,094 | B2 | 9/2020 | Amer et al. | |
| 10,908,068 | B2 | 2/2021 | Amer et al. | |
| 11,112,349 | B2 | 9/2021 | Amer | |
| 11,162,888 | B2 | 11/2021 | Al Shehri | |
| 11,386,541 | B2 | 7/2022 | Al Shehri | |
| 2012/0330569 | A1 * | 12/2012 | Singh .................. | G01N 29/069 702/39 |
| 2016/0284075 | A1 | 9/2016 | Phan et al. | |
| 2023/0152792 | A1 * | 5/2023 | Mears ................ | G05B 23/0224 700/109 |

FOREIGN PATENT DOCUMENTS

| | | | |
|---|---|---|---|
| WO | 2021133265 | A1 | 7/2021 |
| WO | 2022119870 | A1 | 6/2022 |

OTHER PUBLICATIONS

Han et al.; Transformer Defects Detectio Method Based on Visible and Infrared Fusion Images; 2021 International Conference on Electrical Materials and Power Aquipment, IEEE, Apr. 11, 2021; pp. 1-4.

Amer et al.; Artificial Intelligence to Enhance Corrosion under Insulation Inspection; SPE-202783; Nov. 21, 2020; 18 pages.

Singh; IN 202211039583; filed Jul. 1, 2022; 19 pages.

* cited by examiner

PROBABILITY OF DETECTION OF LIFECYCLE PHASES OF CORROSION UNDER INSULATION USING ARTIFICIAL INTELLIGENCE AND TEMPORAL THERMOGRAPHY

RELATED APPLICATION

This application claims priority under 35 U.S.C. § 119(e) to U.S. Provisional Application No. 63/371,346, filed Aug. 12, 2022, entitled "Nondestructive Detection and Classification of Lifecycle Phases of Corrosion Under Insulation on Industrial Assets," which is hereby incorporated by reference as if set forth in its entirety herein.

BACKGROUND

Corrosion under insulation (CUI) is a condition in which an insulated structure such as a metal pipe suffers corrosion on the metal surface beneath the insulation. As the corrosion cannot be easily observed due to the insulation covering, which typically surrounds the entire structure, CUI is challenging to detect. The typical causes of CUI are moisture buildup that infiltrates into the insulation material. Water can accumulate in the annular space between the insulation and the metal surface, causing surface corrosion. Sources of water that can induce corrosion include rain, water leaks, and condensation, cooling water tower drift, deluge systems and steam tracing leaks. While corrosion usually begins locally, it can progress at high rates if there are repetitive thermal cycles or contaminants in the water medium such as chloride or acid.

SUMMARY

In one aspect, a system for determining corrosion under insulation is provided. The system can include an infrared camera configured to acquire one or more time-series infrared images of an industrial area including an industrial asset. The system can further include a computing device including at least one hardware data processor, and a memory coupled to the at least one data processor. The memory storing instructions causes the at least one data processor to perform operations including receiving data characterizing the one or more time-series infrared images and identifying an area of interest of the industrial asset within the one or more time-series infrared images. The operations can further include identifying, by a machine learning algorithm, a plurality of defects within the area of interest, wherein each defect of the plurality of defects is identified based on pixel-wise assignment of at least one defect category selected from a plurality of defect categories associated with a lifecycle of corrosion under insulation of the industrial asset. The operations can also include providing the so-identified plurality of defects within the area of interest of the industrial asset for downstream assessment, action, or both.

In some implementations, the plurality of defect categories can include a healthy asset category, a moisture accumulation category, an insulation damage category, a metal corrosion category, and a severe corrosion category. The lifecycle of corrosion under insulation of the industrial asset can include a sequence of progressive stages of corrosion of the industrial asset. In some implementations, the area of interest can be automatically identified or identified based on user-provided input.

In some implementations, the machine learning algorithm can be trained by providing one or more training configuration parameters associated with at least one defect lifecycle of a defect of the industrial asset and generating a plurality of defect patch images based on the one or more training configuration parameters. To be clear, the plurality of defect patch images referred to herein are ones that include the defect. The machine learning algorithm can also be trained by applying one or more of the defect patch images onto time-series image data of the industrial asset. The time-series image data can exclude any defects of the industrial asset. The machine learning algorithm can also be trained by generating time-series training data based on the steps of applying and training the machine learning algorithm using the generated time-series training data.

In some implementations, the time-series training data can further comprise annotated time-series image data including one or more known defects of the industrial asset. In some implementations, the one or more training configuration parameters can be associated with the industrial asset and can include a surface temperature associated with the industrial asset, a type of fluid within the industrial asset, a temperature of a fluid within the industrial asset, an atmospheric condition where the industrial asset is located, a type of defect, a size of a defect, a shape of a defect, a depth of a defect, a location of a defect, a metal thickness of the industrial asset, a material of the industrial asset, a thickness of the insulation.

In some implementations, applying the one or more defect patch images to the time-series image data of the industrial asset can include scaling a simulated size of the defect to an actual size of the defect. In some implementations, the one or more defect patch images can be applied onto the time-series image data at random locations on the industrial asset. In some implementations, the industrial asset can be a horizontal pipe and the one or more defect patch images are applied to an inferior portion of the horizontal pipe simulating gravitational force. In some implementations, the one or more defect patch images can be applied at pre-determined locations based on historical observation data of the industrial asset.

In some implementations, generating the plurality of defect patch images can include determining, using a first physical model of temperature propagation across a cross-section of the industrial asset, at least one temperature profile of the industrial asset responsive to providing a defect depth as the training configuration parameter or a defect size as the training configuration parameter. Generating the plurality of defect patch images can also include generating, based on the determining step, a surface temperature for each pixel included in the plurality of detect patches. Generating the plurality of defect patch images can also include providing the surface temperatures in the cross-section of the industrial asset in the plurality of defect patch images.

In some implementations, generating the plurality of defect patch images can include determining, using a second physical model of temperature propagation across a surface of the industrial asset, at least one surface temperature profile of the industrial asset responsive to providing a defect location as a corrosion origination point as training configuration parameters. Generating the plurality of defect patch images can also include generating, based on the corrosion origination point, a surface temperature distribution within the plurality of defect patches. Generating the plurality of defect patch images can also include providing the surface temperature distribution in the plurality of defect patch images, wherein the surface temperature distribution extends across the surface of the industrial asset from the corrosion origination point toward edges of the plurality of defect patch images.

In some implementations, a camera noise model corresponding to the infrared camera can be applied to the plurality of defect patch images to generate a plurality of modified defect patch images, wherein the plurality of modified defect patch images include the surface temperature distribution with added noise due to the infrared camera.

In some implementations, the generated time-series training data can be used to determine a probability of detection for the machine learning algorithm, the probability of detection based on the machine learning algorithm predicting at least one defect in the one or more time-series infrared data matching a corresponding defect present in the generated time-series data, wherein the probability of detection is indicative of the machine learning algorithms performance detecting a defect location or a defect size, and classifying the defect. In some implementations, the machine learning algorithm can be trained in a machine learning process including at least one of a convolutional neural network, a recurrent neural network, a long short-term memory network, or a vision transformer.

In accordance with further aspect of the present disclosure, in certain implementations the AI model can be configured to synthesize simulated data to augment or balance the categories of defects with corresponding defect type labels to supplement the existing real data, under control of code executing therein. The simulated data can be used in initial POD determinations and thereafter removed from POD determinations performed once more real data become available that the real data is deemed sufficient and balanced, such as by exceeding a prescribed threshold applicable to the data under review. A dataset generation system or subsystem can comprise its own hardware processor and code executing therein, or can be part of the system(s) that implement methods described herein.

In certain implementations in which data is synthesized, the dataset generation system can include, among other configuration parameters, environmental parameters concerning the location of the industrial asset being analyzed, the type of condition monitoring location under review, the category or subcategory of defect, and the actual data that had been acquired, such as a set of thermographic IR images. These configurations are included together within a catalog of IR videos of actual captured data which include CML mask locations which have no defect, which are stored in a database. The code that executes in the processor to perform the POD computations uses known thermodynamic equations operating on the configuration provided to the processor, and a temperature offset time series 1108, such as determined by the heat transfer thermodynamic computations, as well as the heat transfer computations, are used to compute the synthetic data points which are then fed into a video synthesis module. The video synthesis module develops the synthetic data to augment the real data with no defects by providing further datasets that are stored in database for the AI model to use for augmented training and testing, and POD calculations. The video synthesis module also receives a subset of IR videos in accordance with CML properties for like-(sub)category defects, wherein the subset of IR videos are obtained from a database.

In another aspect, a system for determining corrosion under insulation is provided. The system can include an infrared camera configured to acquire one or more time-series infrared images of an industrial area including an industrial asset. The system can further include a computing device including at least one hardware data processor, and a memory coupled to the at least one data processor. The memory storing instructions can cause the at least one data processor to perform operations including receiving data characterizing the one or more time-series infrared images and identifying an area of interest of the industrial asset within the one or more time-series infrared images. The operations can further include identifying, by a machine learning algorithm, at least one defect within the area of interest, wherein the at least one defect is identified based on pixel-wise assignment of at least one defect category selected from at least one defect category of a plurality of defect categories associated with a lifecycle of corrosion under insulation of the industrial asset. The machine learning algorithm can be trained by providing one or more training configuration parameters associated with at least one defect lifecycle of a defect of the industrial asset and generating at least one defect patch image based on the one or more training configuration parameters. Again, to be clear the at least one defect patch image referred to herein includes the defect. The machine learning algorithm can also be trained by applying at least one defect patch image onto time-series image data of the industrial asset. The time-series image data can exclude any defects of the industrial asset. The machine learning algorithm can also be trained by generating time-series training data based on applying and training the machine learning algorithm using the generated time-series training data. The generated time-series training data can be used to determine a probability of detection for the machine learning algorithm. The probability of detection based on the machine learning algorithm that predicts at least one defect in the one or more time-series infrared data matches a corresponding defect present in the generated time-series data, wherein the probability of detection is indicative of the machine learning algorithms performance detecting a defect location or a defect size and classifying the defect. The operations can also include providing the plurality of defects within the area of interest of the industrial asset.

In another aspect, a method for determining corrosion under insulation is provided. The method can include receiving, by a hardware data processor, data characterizing one or more time-series infrared images of an industrial asset acquired via an infrared camera. The method can also include identifying, by the data processor, an area of interest of the industrial asset within the one or more time-series infrared images. The method can further include identifying, by the data processor, a plurality of defects within the area of interest using a machine learning algorithm, wherein each defect of the plurality of defects is identified based on pixel-wise assignment of at least one defect category selected from a plurality of defect categories associated with a lifecycle of corrosion under insulation of the industrial asset. The method can also include providing, by the data processor, the plurality of defects within the area of interest of the industrial asset.

In some implementations, the plurality of defect categories can include a healthy asset category, a moisture accumulation category, an insulation damage category, a metal corrosion category, and a severe corrosion category, and further wherein the lifecycle of corrosion under insulation of the industrial includes a sequence of progressive stages of corrosion of the industrial asset. In some implementations, the area of interest can be automatically identified or identified based on user-provided input.

In some implementations, the machine learning algorithm can be trained by providing one or more training configuration parameters associated with at least one defect lifecycle of a defect of the industrial asset and generating a plurality of defect patch images based on the one or more training configuration parameters. Again, the plurality of defect patch images referred to herein are those that include the defect. The machine learning algorithm can also be trained by applying one or more of the defect patch images onto time-series image data of the industrial asset. The time-series image data can exclude any defects of the industrial asset. The machine learning algorithm can also be trained by generating time-series training data based on the applying and training the machine learning algorithm using the generated time-series training data.

In some implementations, the time-series training data can further comprise annotated time-series image data including one or more known defects of the industrial asset. In some implementations, the one or more training configuration parameters can be associated with the industrial asset and can include a surface temperature associated with the industrial asset, a type of fluid within the industrial asset, a temperature of a fluid within the industrial asset, an atmospheric condition where the industrial asset is located, a type of defect, a size of a defect, a shape of a defect, a depth of a defect, a location of a defect, a metal thickness of the industrial asset, a material of the industrial asset, a thickness of the insulation.

In some implementations, applying the one or more defect patch images on to the time-series image data of the industrial asset can include scaling a simulated size of the defect to an actual size of the defect. In some implementations, the one or more defect patch images can be applied onto the time-series image data at random locations on the industrial asset. In some implementations, the industrial asset can be a horizontal pipe and the one or more defect patch images are applied to an inferior portion of the horizontal pipe simulating gravitational force. In some implementations, the one or more defect patch images can be applied at pre-determined locations based on historical observation data of the industrial asset.

In some implementations, generating the plurality of defect patch images can include determining, using a first physical model of temperature propagation across a cross-section of the industrial asset, at least one temperature profile of the industrial asset responsive to providing a defect depth as the training configuration parameter or a defect size as the training configuration parameter. Generating the plurality of defect patch images can also include generating, based on the determining step, a surface temperature for each pixel included in the plurality of detect patches. Generating the plurality of defect patch images can also include providing the surface temperatures in the cross-section of the industrial asset in the plurality of defect patch images.

In some implementations, generating the plurality of defect patch images can include determining, using a second physical model of temperature propagation across a surface of the industrial asset, at least one surface temperature profile of the industrial asset responsive to providing a defect location as a corrosion origination point as training configuration parameters. Generating the plurality of defect patch images can also include generating, based on the corrosion origination point, a surface temperature distribution within the plurality of defect patches. Generating the plurality of defect patch images can also include providing the surface temperature distribution in the plurality of defect patch images, wherein the surface temperature distribution extends across the surface of the industrial asset from the corrosion origination point toward edges of the plurality of defect patch images.

In some implementations, a camera noise model corresponding to the infrared camera can be applied to the plurality of defect patch images to generate a plurality of modified defect patch images, wherein the plurality of modified defect patch images include the surface temperature distribution with added noise due to the infrared camera.

In some implementations, the generated time-series training data can be used to determine a probability of detection for the machine learning algorithm, the probability of detection based on the machine learning algorithm predicting at least one defect in the one or more time-series infrared data matching a corresponding defect present in the generated time-series data, wherein the probability of detection is indicative of the machine learning algorithms performance detecting a defect location or a defect size, and classifying the defect. In some implementations, the machine learning algorithm can be trained in a machine learning process including at least one of a convolutional neural network, a recurrent neural network, a long short-term memory network, or a vision transformer.

Non-transitory computer program products (i.e., physically embodied computer program products) are also described that store instructions, which when executed by one or more hardware data processors of one or more computing systems, causes at least one hardware data processor to perform operations herein. Similarly, computer systems are also described that may include one or more hardware data processors and physical or virtual memory coupled to the one or more data processors. The memory may temporarily or permanently store instructions that cause at least one processor to perform one or more of the operations described herein. In addition, methods can be implemented by one or more hardware data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

These and other capabilities of the disclosed subject matter will be more fully understood after a review of the following figures, detailed description, and claims.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

An industrial asset (e.g., insulated pipe) can develop defects during the course of its operation. A defect, if left unattended, can evolve (e.g., grow in size, transform into a different defect), and hinder the operation of the industrial asset (e.g., cause the material to spill over or the industrial asset to shut-down). It can be desirable to detect a defect at an early stage and/or monitor its evolution so that a corrective action can be performed in a timely manner. In many cases, the defect can be located below the surface of the industrial asset (e.g., corrosion under the insulation layer of an insulation pipe). This can render the detection of defect challenging. Existing inspection techniques rely on ultrasound detection that can be slow and inefficient (e.g., especially for large industrial assets). Additionally, these techniques are incapable of classifying the defect type. For example, these techniques are unable to distinguish between different defect types (e.g., as the defect evolves from one type to another type). Therefore, there is a need in the art to develop and improve inspection techniques that can quickly and efficiently detect the location of hidden defects (e.g., corrosion damages) and identify the defect type.

Figure 1A:
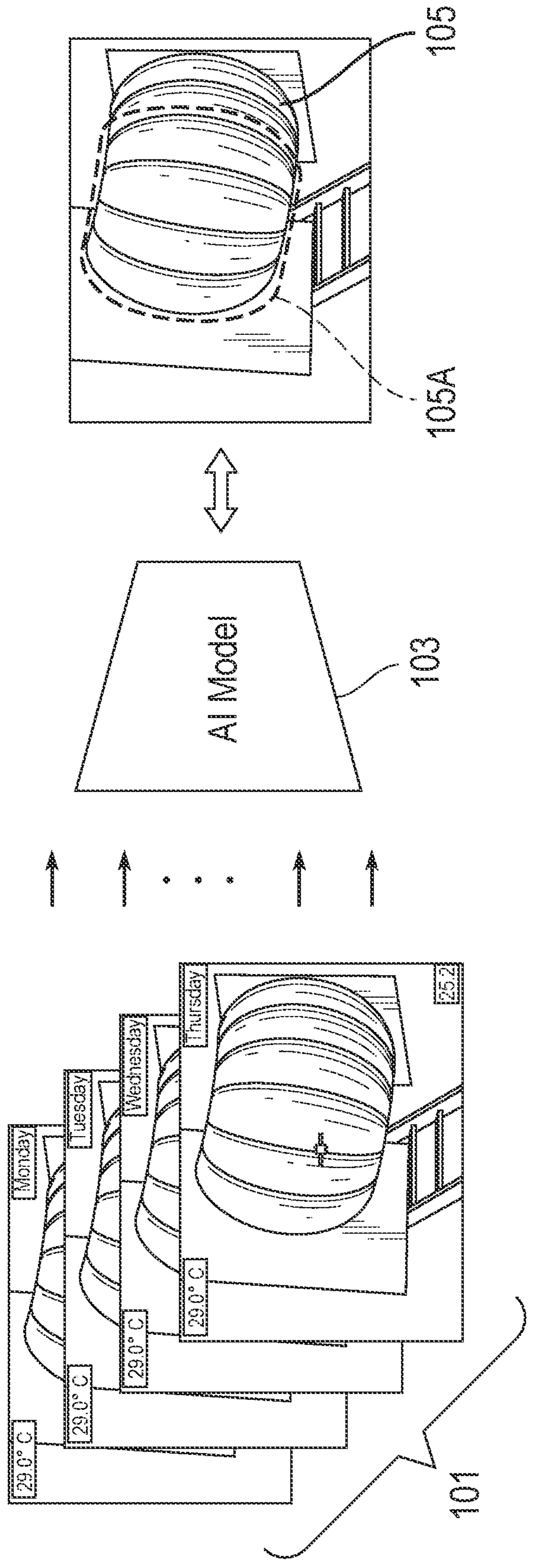
FIG. 1A is a schematic diagram showing inputs and outputs of an artificial intelligence model that is trained on a series of infrared thermographic images concerning a region of an industrial asset as part of an exemplary prediction system for detection of corrosion-under-insulation.
Figure 1B:
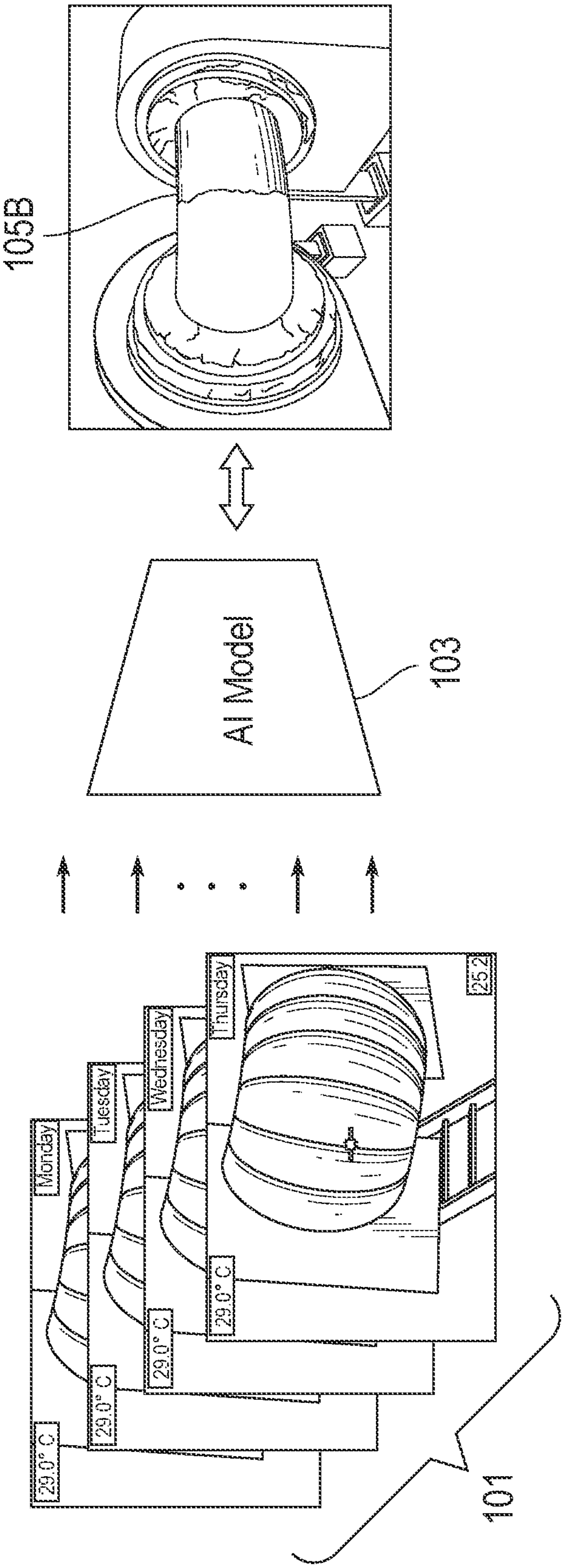
FIG. 1B is the schematic diagram of FIG. 1A in which the inputs to the artificial intelligence model that is being trained is being provided with labels (the outputs of FIG. 1A) based on the actual ground truth data concerning the condition of the industrial asset having a particular defect.

In some implementations of the current subject matter, a prediction system is described that can detect and identify defects in an insulated pipe. As illustrated in FIG. 1A, the detection and identification are based on acquisition of one or more infrared images 101 (e.g., a sequence or a time-series of infrared images) of the insulated pipe. The prediction system can include predictive analysis capabilities (e.g., in real time) that can detect and identify a defect in the insulated pipe, using an artificial intelligence ("AI") model 103 that learns from annotated data. In some implementations, the prediction system can alert a technician of the presence of the defect. For example, the prediction system can generate an image of the insulated pipe 105 (or a portion thereof), and identify the location and type of the defect therein, such as location 105A. The image can be provided to the technician, and as a result allow for a rapid response to the defect. This can improve the maintenance of the insulated pipe that can result in longer lifetime of the insulated pipe. As illustrated in FIG. 1B, the location of a defect 105A and the training of the AI model 103 are done with ground truth information in which an industrial asset is stripped of its insulation and the existence of a defect and its parameters (size, classification and other information) is verified. The so-stripped industrial asset, having been exposed, has the defect 105B ready for providing the labels needed for the training of the AI model and/or for verification purposes while performing a classic direct inspection. The AI model is part of a prediction system 100 described next.

Figure 1C:
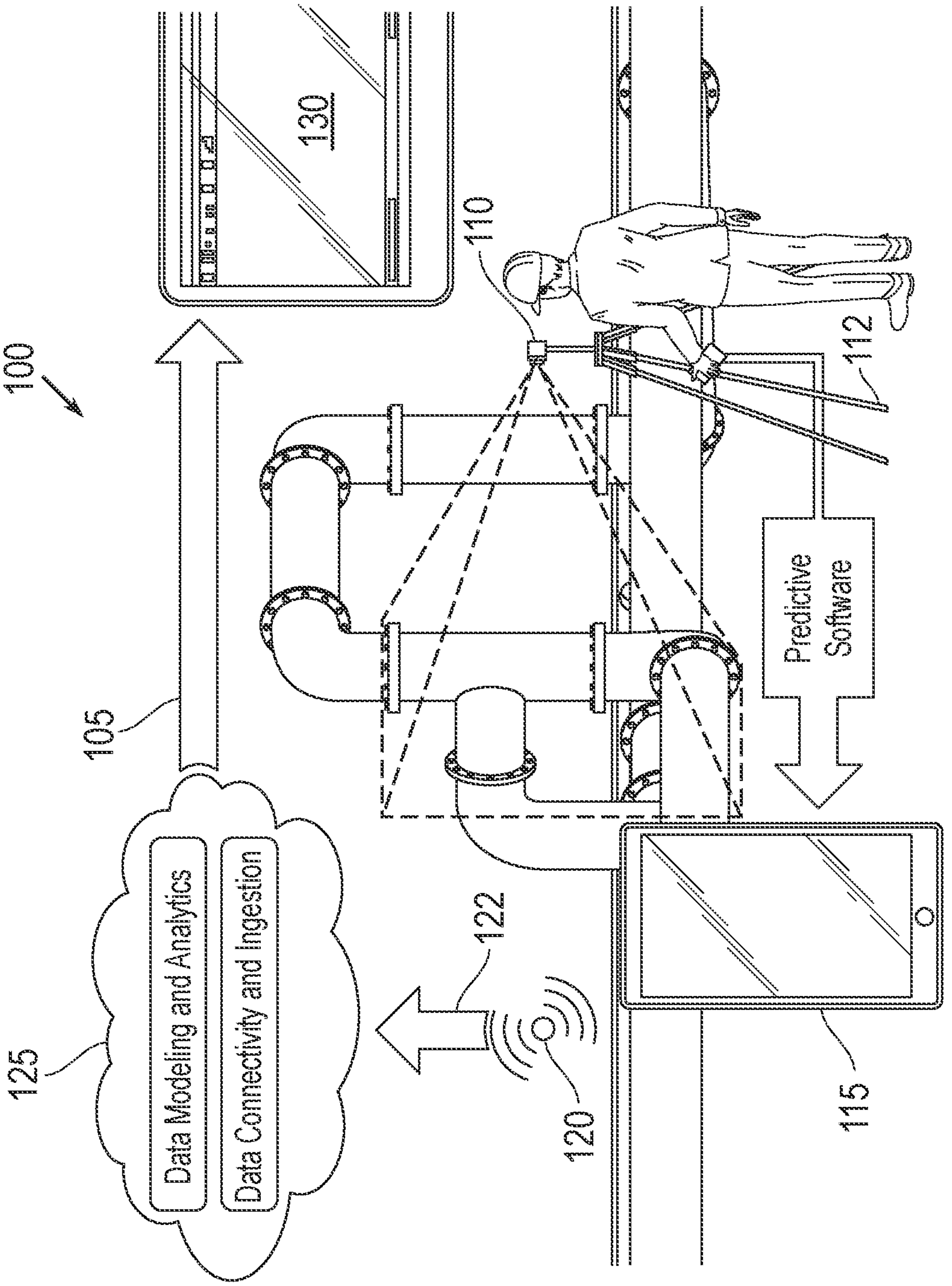
FIG. 1C is a schematic illustration of an exemplary prediction system for detection of corrosion-under-insulation.

FIG. 1C is a schematic illustration of an exemplary prediction system 100 for prediction and detection of corrosion-under-insulation (CUI). FIG. 1 shows an exemplary industrial asset (e.g., an insulated pipe) 105 to be tested. The insulated pipe can include a metallic pipe conduit surrounded by one or more layers of insulation. Moisture can be trapped in the annular region of the insulated pipe (e.g., between the insulation and the metallic portion of the pipe). An infrared camera 110 (e.g., Wi-Fi enabled infrared camera) can capture infrared radiation and record infrared images associated with the insulated pipe 105. In some embodiments, the camera 110 can be a permanently positioned camera or a semi-permanently positioned camera, such as a camera on a mobile platform. While a single camera is shown in the FIG. 1, the prediction system 100 can include multiple cameras that can capture the image of the industrial asset 105 from different vantage points. In some embodiments, multiple cameras 110 can be configured to acquire image data synchronously (e.g., at a constant rate with respect to one another) or asynchronously (e.g., periodically acquired at non-constant rates). The image data can be acquired by cameras 110 on a schedule. The schedule can be associated with an inspection guideline or procedure for the industrial asset.

In some embodiments, the prediction system 100 can determine a binary determination of corrosion that can be present. For example, the prediction system can determine whether corrosion is present or whether corrosion is not present. In some embodiments, the prediction system 100 can be configured to determine the presence of different types of corrosion. For example, the corrosion can include moisture, insulation damage, and/or a loss of material. In some embodiments, the prediction system 100 can determine a rate of corrosion based on historical infrared data and comparing the current infrared data to previously collected infrared data of the asset.

The infrared images of the industrial pipe 105 captured by the infrared camera 110 can reveal internal thermal contrasts that may be undetectable in the visible spectrum radiation. The internal thermal contrasts can be indicative of various defects associated with the insulated pipe 105. For example, the thermal contrasts can be indicative of moisture accumulation, insulation damage, metal corrosion, severe corrosion, etc. In some cases a defect may evolve during the lifecycle of the insulated pipe. For example, a moisture accumulation in the insulation layer of the insulated pipe 105 may transform into insulation damage of the insulation layer that may in turn transform into metal corrosion. The metal corrosion, if left unattended, can transform into severe corrosion of the metal portion of the insulated pipe 105.

In some implementations, the infrared camera 110 can acquire multiple infrared images of the insulated pipe 105. For example, the infrared images can be acquired periodically (e.g., at regular time intervals). The infrared images can be converted into standardized computer-readable file format. The infrared camera 110 can be positioned on a mount 112 (e.g., a tripod). The mount 112 can be extendable to reach high elevations relative to the insulated pipe 105 (e.g., by telescoping), and can include a mechanical head fixture coupling to the camera that has several degrees of freedom to pan and tilt at various angles with respect to a fixed plane. Field technical personal can set the extension and orientation of the mount head to capture infrared images from different areas of the structure, as required. In some embodiments, the prediction system 100 can determine defect data based on a distance of the camera 110 with respect to the industrial asset or an angle at which the camera 110 is observing the industrial asset.

In some implementations, identification tags can be posted on industrial assets, or portions thereof. The precise geographical location of each tag can be determined using GPS. The identification tags can be implemented using image-based tags such as QR codes that are readable from a distance. In some implementations, a standard camera can be included along with the infrared camera on the mount 112 to scan tags on the assets. Depending on the size of tags (of known size) in the image, distances from the camera to the tags can be determined. Tagging enables simultaneous scanning and localization of the facility assets without the need to create complex three-dimensional CAD models of the facility.

The infrared camera 110 can be physically and communicatively coupled to the mount 112 (e.g., wirelessly by Bluetooth or Wi-Fi communication). The mount 112 can include or can be coupled to one or more additional detectors, such as electromagnetic sensors (not shown in FIG. 1), which can be used to probe the insulated pipe 105 and obtain supplemental readings to complement the data obtained by infrared imaging. The mount 112 can be communicatively coupled to a computing device 115 (e.g., a tablet, laptop, etc.). The mount 112 can be configured to transmit infrared or thermographic files received from the camera 110 to the computing device 115.

The computing device 115 preferably stores executable applications for pre-processing and predictive analysis. Preprocessing can include image filtering steps for reducing noise in the images that can arise from many causes. The computing device 115 can execute one or more machine learning algorithms such as the AI model 103 discussed above that can receive data characterizing images (e.g., a time-series of infrared images) of the industrial asset (e.g., insulated pipe 105), data characterizing ambient information (e.g., temperature, pressure, humidity, etc.) associated with the industrial asset as input. The machine learning algorithm can add visual indicators that indicate the location of the defect in the industrial asset, and type of defect (e.g., moisture accumulation, insulation damage, metal corrosion, severe corrosion, etc.) as output. In some implementations, the machine learning algorithm can include convolutional networks, recurrent neural networks, etc., that can track changes in the defect over time (e.g., evolution of the defect from moisture accumulation to severe corrosion). Tracking changes in the defect allows field technical personal to support observations and focus rapidly on high-risk areas of the structure that are more likely subject to corrosion damage.

In some implementations, the computing device 115 can communicate wirelessly via a network switch 120 (via wireless communication network 122) with a cloud computing platform 125. Wireless network 122 can be a wireless local area network (WLAN), wireless wide area networks (WWAN), cellular networks or a combination of such networks. The cloud computing platform 125 includes computing resources that can be dynamically allocated, including one or more hardware processors (e.g., one or more servers or server clusters), that can operate independently or collaboratively in a distributed computing configuration. The cloud computing platform 125 can include database storage capacity for storing computer-executable instructions for hosting applications and for archiving received data for long term storage. For example, computing device 115 in the field can upload all infrared images and other data received to the cloud computing platform 125 for secure storage and for further processing and analysis. In some implementations, the computing device 115 can format and send data records in MySQL or another database format. An example database record can include, among other fields, a tagged asset location, a series of infrared images taken over time at a particular asset location (or a link thereto), the data value for the camera's ID (cameraID) of the camera that captured the infrared images, the time/date at which each image was captured, ambient conditions at the time/date (e.g., temperature, pressure, humidity, etc.), sensor fusion data (e.g., electromagnetic sensor data). The cloud database can store a detailed geographical mapping of the location and layout of the infrastructure assets (e.g., from LiDAR data) and applications executed on the cloud platform can perform detailed analyses that combine the sensor data and predictive analyses with the detailed mapping of the assets to make risk assessments covering entire structures or groups of structures. Reports of such assessments and results of other processing performed at the cloud computing platform 125 can be accessible to a control station 130 communicatively coupled to the cloud computing platform. In some implementations, the smart mount 112 can format and transmit the received data to the cloud computing platform directly before analysis of the data is performed on site.

In some implementations, data from two or more distinct and independent sensing modes can be combined, referred to as "sensor fusion" that can make downstream prediction and detection much more robust by reduction of false positive classifications. The mount 112 also includes sensors for detecting ambient conditions including temperature, humidity, and air pressure. Received infrared images can be associated with the ambient conditions and the current time at which the ambient conditions are recorded. This data comprises parameters used by the machine learning algorithms that contribute to the interpretation and classification of the infrared images captured from the structure.

Figure 2:
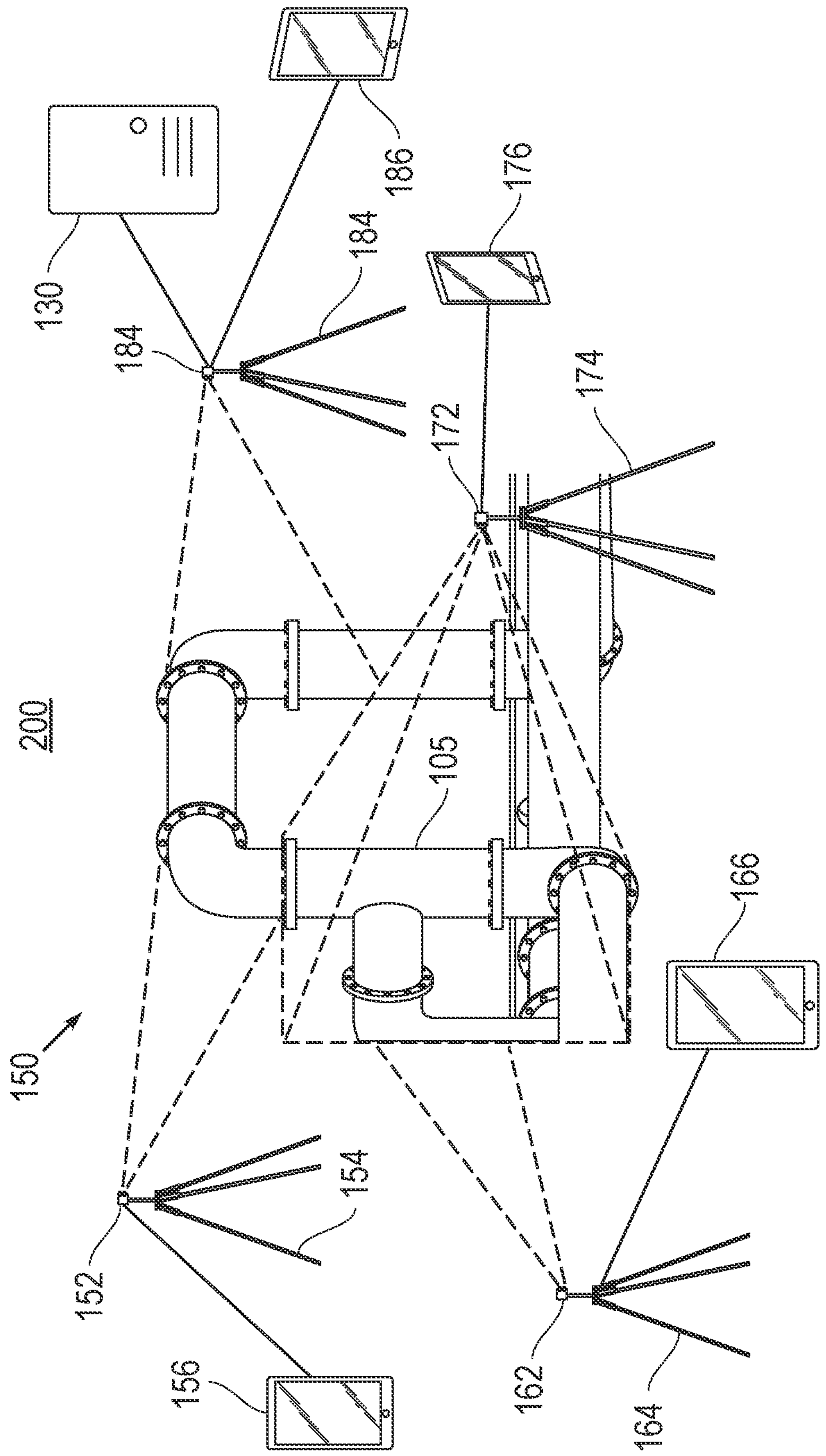
FIG. 2 depicts an exemplary implementation of a cloud-based system for CUI prediction and detection more generally shown in FIG. 1.

FIG. 2 depicts an exemplary implementation of a cloud-based learning system for CUI prediction and detection more generally shown in FIG. 1. In FIG. 2, this system 150 includes four sets of cameras, mounts and computing devices ("investigative kits") positioned at various positions in proximity to structure 105 for capturing infrared image and other data. Although four investigative kits are used in this embodiment, it is again noted that fewer or a greater number of kits can be employed depending, for example, on the size of the structure or installation investigated. For example, the system 150 can be configured using a first infrared camera 152 associated with a first mount 154 and first computing device 156 positioned at a first location; a second infrared camera 162 associated with a second mount so 164 and second computing device 166 positioned at a second location; a third infrared camera 172 associated with a third mount 174 and third computing device 176 positioned at a third location; and a fourth infrared camera 182 associated with a fourth mount 184 and fourth computing device 186 positioned at a forth location proximal to the asset 105. Two-way wireless communications can be supported by all the mounts and computing devices of the system, each of which can thus communicate with each other. For example, infrared image data received by the computing devices 156, 166, 176, 186, can be transmitted to the cloud computing platform 125 via network switch 120, and to control station 130. Alternatively, the smart mounts 154, 164, 174, 184 can communicate directly with the control station when wireless connectivity is available. By providing redundant connectivity, each smart mount or computing device in the system can act as a communication node in a multi-node system, so that if one or more of the mounts or computing devices loses connectivity with the control station, data can be forwarded to other nodes that maintain connectivity. The control station 130 is configured to provide configuration and control commands to the smart mounts 154, 164, 174, 184 or computing devices 156, 166, 176, 186.

Figure 3:
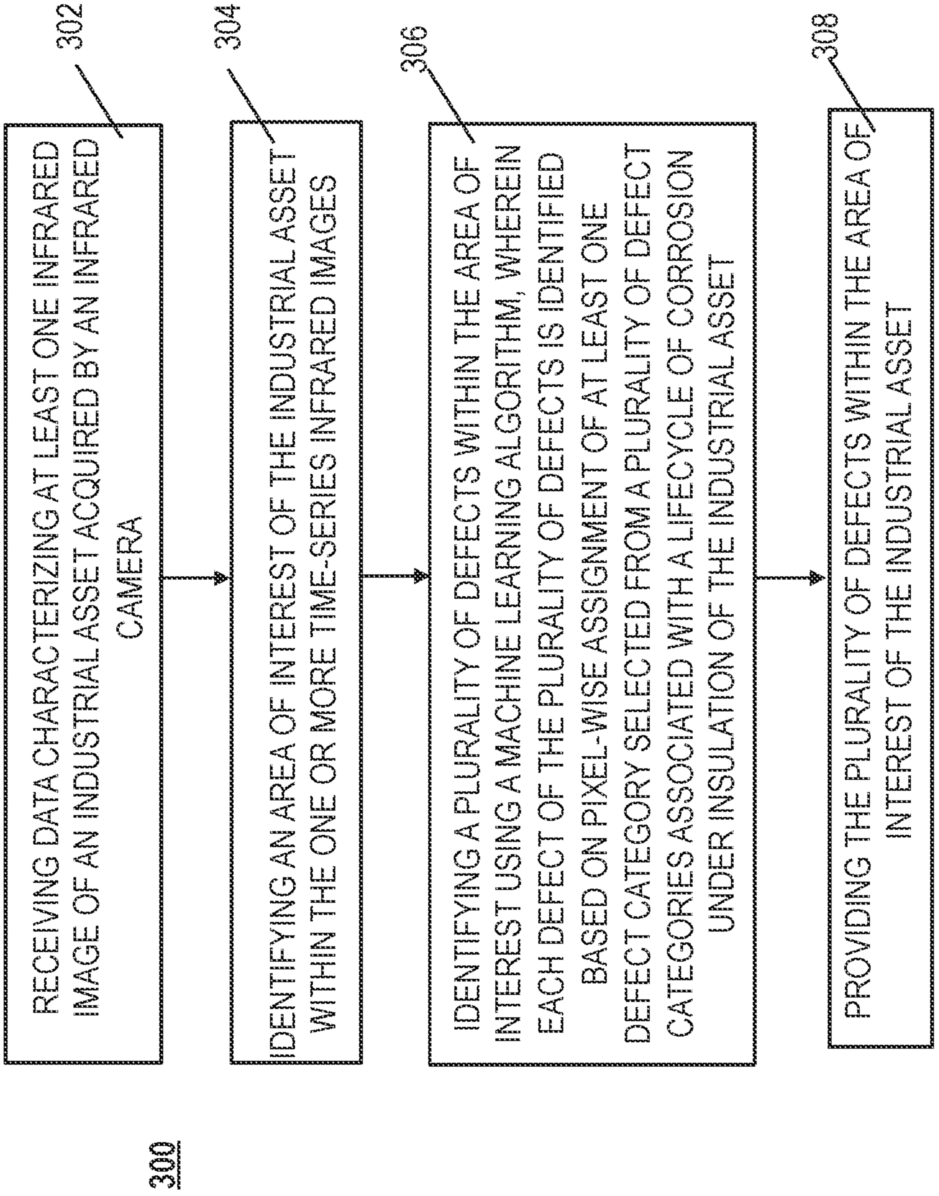
FIG. 3 is a flow diagram illustrating one embodiment of a method for identifying a defect in an insulated pipe.

FIG. 3 is a flow diagram illustrating one embodiment of a method 300 for identifying a defect in an insulated pipe. At step 302, data characterizing at least one infrared image of an industrial asset (e.g., insulated pipe) can be received. For example, one or more infrared images can be captured by an infrared camera (e.g., infrared camera 110). Data characterizing the one or more infrared images can be received by a computing device (e.g., computing device 115, computing resources of cloud computing platform 125, etc.). In some implementations, data characterizing the one or more infrared images can be transmitted by the mount 112 to the computing device 115 (e.g., wirelessly communicated). In some implementations, the computing device 115 can receive the data characterizing the one or more infrared images and transmit the received data (or a portion thereof) to the cloud computing platform 125 (e.g. by the network switch 120 via wireless communication network 122).

Figure 4:
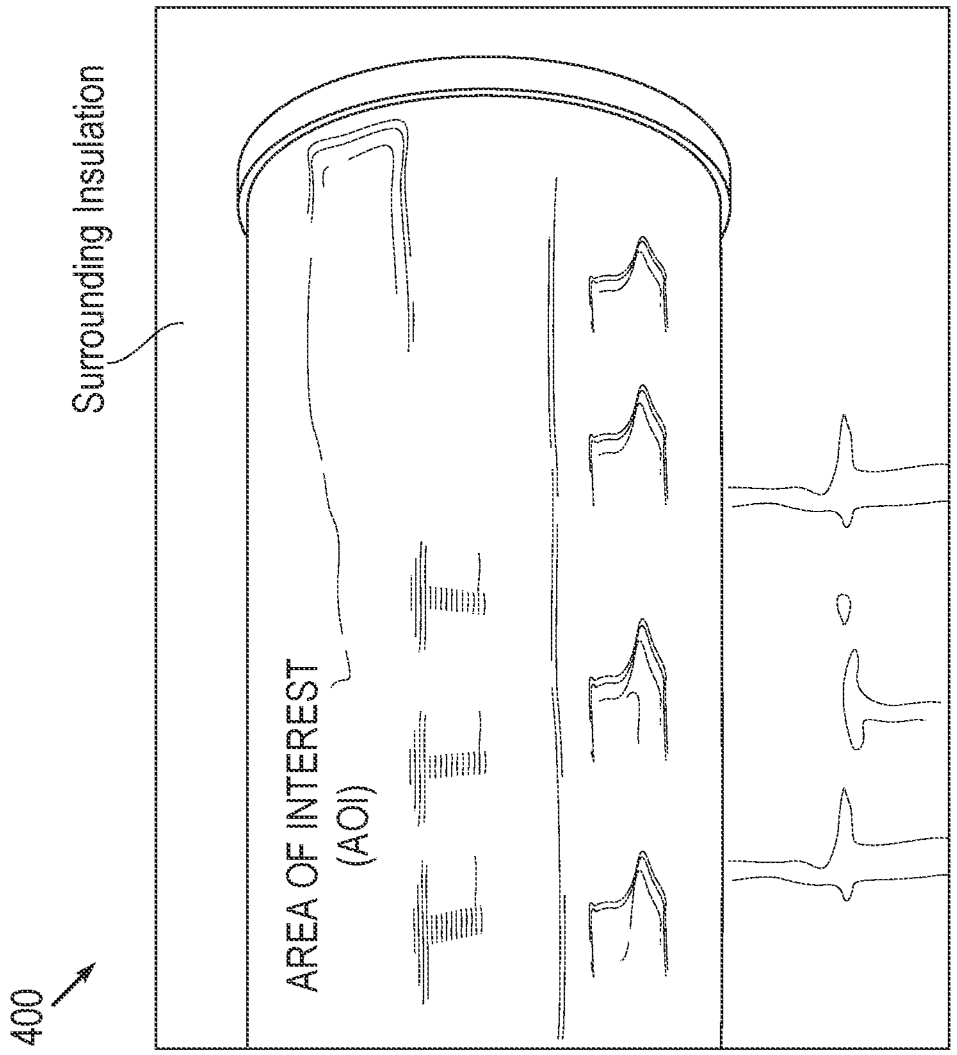
FIG. 4 illustrates a visual representation of an infrared image of an insulated pipe.

FIG. 4 illustrates a visual representation 400 of an infrared image of an insulated pipe. The shade of a region of the visual representation 400 can be indicative of absorption of infrared radiation. For example, regions of the visual representation 400 having a lighter shade can be representative of a smaller absorption of infrared radiation compared to regions of the visual representation 400 having a darker shade.

At step 304, an area of interest of the industrial asset can be identified within the one or more time-series infrared images. Additionally, at 306, a machine learning algorithm can identify a plurality of defects such as area 105A within the area of interest. Each defect within the plurality of defects can be identified based on pixel-wise assignment of at least one defect category selected from a plurality of defect categories associated with a lifecycle of corrosion under insulation of the industrial asset. The identifying step can be based on the predicted portions of the one or more time-series images and a one or more training images of the industrial asset. The machine learning algorithm can be executed by the computing device 115 and/or computing resources of cloud computing platform 125. The identification of defects in a portion of the data can be based on one or more infrared images of the industrial asset (e.g., infrared images received at step 102). In some implementations, the machine learning algorithm can receive a plurality of infrared images where each infrared image is captured at a different time as a sequence (or a time-series of infrared images) and ambient information as input, and identify defect portion of data associated with the input images.

Figure 5:
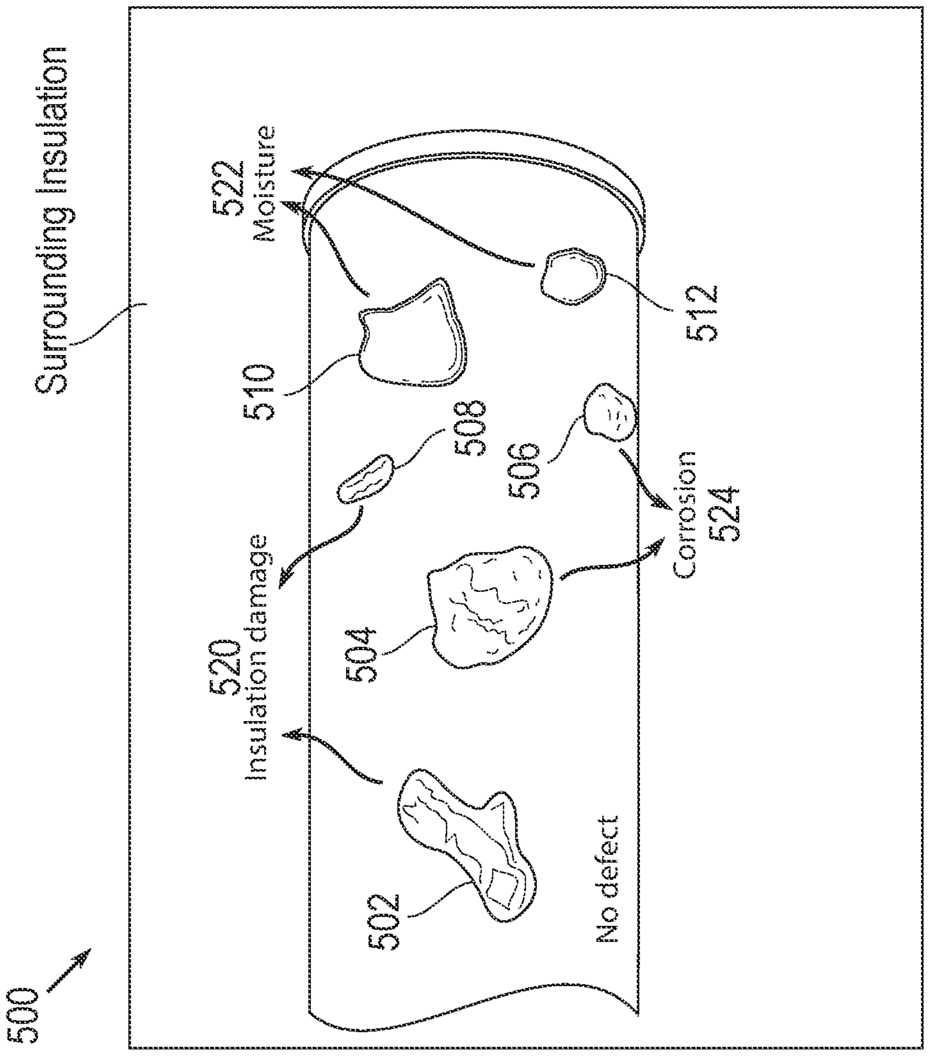
FIG. 5 illustrates an exemplary modified image of the insulated pipe with different categories of defects.

FIG. 5 illustrates an exemplary image 500 of the insulated pipe. The image 500 includes visual indicators 502-512 that can be indicative of locations of defects in the insulated pipe. A visual indicator can indicate the location of a defect, for example, by overlapping with the defect (e.g., by surrounding the defect). In some implementations, a visual property of the visual indicator (e.g., color) can be indicative of the type associated with the defect (e.g., moisture accumulation, insulation damage, metal corrosion, severe corrosion, etc.). In some implementations, the modified image 500 can include separate visual indicators indicative of the type of visual defect.

At step 308, the plurality of defects within the area of interest can be provided to a user (e.g., an operator). Based on the defect portion of the data, the user may determine the response to the detected defects. For example, if the defect is determined to be severe corrosion, the user may choose to replace the insulated pipe or a portion thereof. In some implementations, a notification can be generated when the defect is identified to have a predetermined defect type (e.g., severe corrosion). The notification can be transmitted to computing device(s) of predetermined user(s) to alter him/her of the detected defect.

In some implementations, the machine learning algorithm (AI model) 103 can be trained by a training dataset. The training dataset can include a plurality of images (or training images) of the insulated pipe, associated with the plurality of images, and one or more ground truth values associated with each of the images in the training dataset such as defect 105B of FIG. 1B. The ambient conditions for a training image can include one or more of temperature, humidity, air pressure, etc., in the ambience of the insulated pipe when the training image was acquired.

A first ground-truth value (associated with a first training image of the insulated pipe) can include a type identifier indicative of the type of a first defect in the insulated pipe. The first ground-truth value can also include a first visual identifier that identifies the location of the first defect in the first training image. In some implementations, the training dataset can include multiple ground truth values associated with the first training image. For example, a second ground-truth value can include a second type identifier indicative of the type of a second defect in the insulated pipe and a second visual identifier that identifies the location of the second defect in the first training image.

The machine learning model can be trained using the images and the associated ground-truth value(s) in the training data set. For example, the machine learning model can receive a training image, and predict the location(s) and/or type(s) of defect(s) in the training image. The predicted location(s) and/or type(s) of defect(s) can be compared with the ground-truth value(s), and based on the comparison the machine learning model can be modified in order to improve the convergence between the predicted location(s) and/or type(s) of the defect(s) and the location(s) and/or type(s) of defect in the ground-truth value(s). This process can be repeated for multiple training images in the training dataset.

It should be appreciated that the current subject matter contemplates the use of any machine learning model. For example, the machine learning model may be one or more variants of a recurrent neural network (RNN) such as, for example, a long short-term memory (LSTM) network, or a Vision Transformer based network. A recurrent neural network such as a long-short term memory network may be configured to have longer memories, thereby overcoming the vanishing gradient problem associated with other variants of recurrent neural networks. Accordingly, a recurrent neural network such as a long-short term memory network may be used to handle scenarios where there are long time lags of unknown size between correlated dataset received at different times (e.g., infrared images of the insulated pipe received at different times). The recurrent neural network structure may allow in-time classification, whereby the network may remember what happened before. Whenever when a new dataset (e.g., associated with a new infrared image) is detected, the recurrent neural network may combine its memory and the new dataset together to provide a new classification result (e.g., a new classification of the defect in the insulated pipe).

In some implementations, one or more training images used for training the machine learning algorithm can be generated. For example, a plurality of defect patch images associated with a plurality of corrosion lifecycle scenarios of the industrial asset can be generated. A defect patch is a portion of an image of the industrial asset that includes the image of the defect in the industrial asset. In some implementations, the defect patch can have arbitrary, e.g. random, shapes and can be digitally mixed with images of the industrial asset (e.g., images obtained in real-time). The generating of the plurality of defect patch images can be based on one or more of defect depths associated with the industrial asset, type and temperature of fluid flowing through the industrial asset, defect size and defect types. The defect patch images can be digitally inserted onto an image of the industrial asset (e.g., acquired by the camera 162) upon proper scaling of the simulated defect to the actual size. Digital insertion of the defect patch images (e.g., one or more defect patch image selected from the plurality of defect patch images) can generate a training image of the plurality of training images. Digitally inserting the defect patch images can include placing (e.g., randomly placing) one or more of the plurality of defect patches in the image of the industrial asset at random locations on the asset.

In some implementations, an input identifying an Area of Interest (AOI) can be provided to the system. The AOI input can be provided with respect to a subset of the infrared time-series images to be monitored for defect detection. This AOI is sometimes also referred to as Condition Monitoring Location (CML). This image subset can limit the defect detection to the interior of the area or areas. In some implementations, a given time-series of infrared images may have multiple AOIs defined. In some embodiments, the AOI can identify a 3D shaped region of the asset and need not be limited to a 2D area. In some embodiments, an AOI can be determined manually or programmatically.

In some implementations, the machine learning algorithm can use the simulated defect patches of known types and sizes to calculate the probability of detection (or other metrics or statistical characteristics) that can quantify the ability to detect the defect patch and classify the defect type. In some implementations, the ground truth value associated with a training image can be the defect type associated with the defect patch (or defect patches) included in the training image. In some implementations, the machine learning algorithm can use the simulated defect patches which can be indicative of combinations of underlying conditions/properties of the pipe (e.g. pipe thickness, insulation type and thickness, ambient and the product temperatures, defect depth, etc.) that affect corrosion development to calculate probability of detection (or other metrics or statistical characteristics) of the underlying conditions. In some embodiments, a temperature variation present across a surface of the industrial asset can identify or correspond to a defect.

In some implementations, a physical model can be used to calculate the surface temperatures based on one or more defect depths of the industrial asset based on one or more of diameter of the industrial asset, fluid flowing through the industrial asset, thickness of the industrial asset, material of the industrial asset, thickness and/or material of an insulator of the industrial asset, and defect type. The physical model can receive inputs detected by sensors located at the industrial site (e.g., temperature sensor, humidity sensor, etc.)

Figure 6:
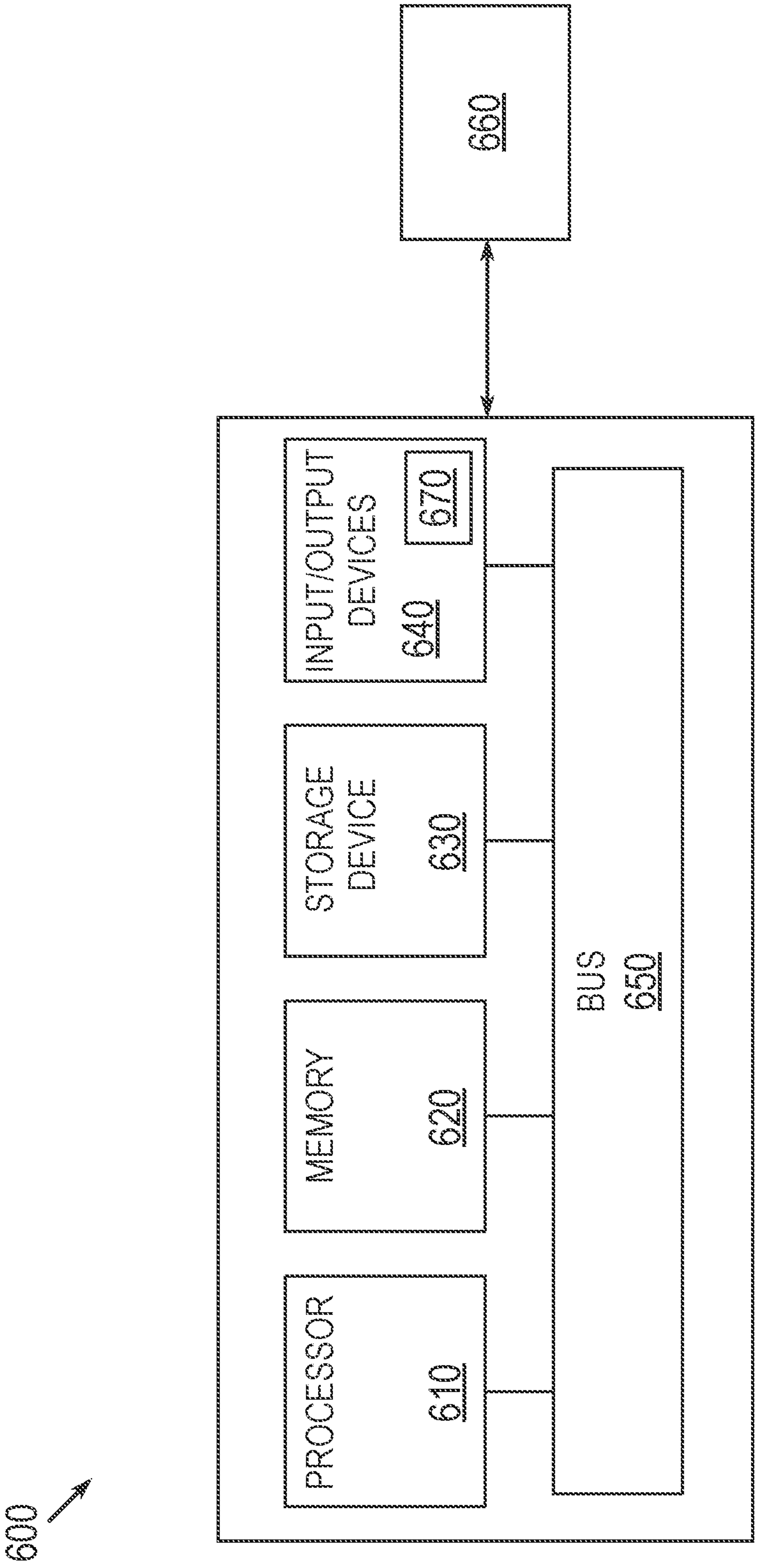
FIG. 6 depicts a block diagram illustrating an example of a computing system, in accordance with some example embodiments.

FIG. 6 illustrates an exemplary computing system 600 configured to execute the data flow described in FIG. 3. The computing system 600 can include a hardware processor 610, a memory 620, a storage device 630, and input/output devices 640. The processor 610, the memory 620, the storage device 630, and the input/output devices 640 can be interconnected via a system bus 650. The processor 610 is capable of processing instructions for execution within the computing system 600. Such executed instructions can implement one or more steps for identifying defect portion of data associated with an image of the insulated pipe. In some example embodiments, the processor 610 can be a single-threaded processor. Alternately, the processor 610 can be a multi-threaded processor. The processor 610 is capable of processing instructions stored in the memory 620 and/or on the storage device 630 to train/execute the machine learning algorithm.

The memory 620 is a computer-readable medium such as volatile or non-volatile that stores information within the computing system 600. The memory 620 can store the training datasets. The storage device 630 is capable of providing persistent storage for the computing system 600. The storage device 630 can be a floppy disk device, a hard disk device, an optical disk device, a tape device, a solid-state drive, and/or other suitable persistent storage means. The input/output device 640 provides input/output operations for the computing system 600.

In some example embodiments, the input/output device 640 includes a keyboard and/or pointing device. In various implementations, the input/output device 640 includes a display unit for displaying graphical user interfaces. In some implementations, a web-browser 670 of the monitoring system can be displayed in a display of the input/output device 640. In some implementations, the computing device 600 can be communicatively coupled to an industrial enterprise database 660. The search engine (e.g., executed by the processor 610) can perform the search (based on a context dataset) in the industrial enterprise database 660.

Certain exemplary embodiments will now be described to provide an overall understanding of the principles of the structure, function, manufacture, and use of the systems, devices, and methods disclosed herein. One or more examples of these embodiments are illustrated in the accompanying drawings in which key performance indicators used in the AI model 103 in accordance with a particular arrangement consistent with the present disclosure. In this arrangement, the probability of detection ("POD") is computed from the selection of condition monitoring locations. The higher the POD, the lower the false negatives are in the monitored data. Mathematically, the POD is computed as follows:

$$PoD = \frac{1}{n}\sum\nolimits_n P(TP) = \frac{1}{n}\sum\nolimits_n \frac{TP}{TP+FN},$$

where TP refers to Positive determinations, P(TP) refers to the probability of true positive determinations, FN refers to the count of False Negative determinations, and n refers to the number of determinations. With further regard to "n," it should be appreciated that, for the multitude of CMLs, each will lead to a different count of TPs and TNs for each (sub)category; as such, the POD for each (sub)category is then computed from the aggregate of these counts. A true positive situation exists when the AI model detects anomalies within the CML. On the other hand, a false negative situation exists when the AI model fails to detect an anomaly at all, or fails to detect an anomaly within the boundary of a given CML. As will be appreciated, more than one anomaly can be detected within a given CML.

At one level, a defect probability of there being a detection of potential corrosion under insulation ("DPCUI") is computed by the AI model with the key performance indicators taken from a relatively coarse granularity of condition monitoring locations ("CML") during asset inspection. The key performance indicators at this level of analysis include a metric indicative of the machine learning algorithm (AI model) of detecting the potential presence of defects. An inspector or facility manager, for instance, can decide whether to strip a given CML 105A (see FIG. 1A) based on compound, high-level information included in the KPIs.

A next level, a defect probability of DPCUI is computed at a median granularity such as by using polygon level KPIs. This comprises a field CML representation of the asset under inspection to report on the performance of the AI model 103 at a deeper level. At this level of granularity, the model uses aggregated pixel results for each defective region to enable further aggregation of defective regions that are part of the same CML, such as location 105A. The key performance indicators at this level of analysis include a metric indicative of the machine learning algorithm (AI model) being able to detect the potential presence of a defect location or a defect size and being able to classify the defect. An inspector or facility manager, for instance, can use this deeper level indicative performance metrics to further assist in deciding whether to strip a given CML 105A (see FIG. 1A) based on compound, medium-level information included in the KPIs.

The AI model is trained in certain arrangements consistent with the present disclosure using a still finer granularity of pixel KPIs. The AI model development is learned and optimized at a per-pixel level in this arrangement, which is a low level of CML.

Figure 7:
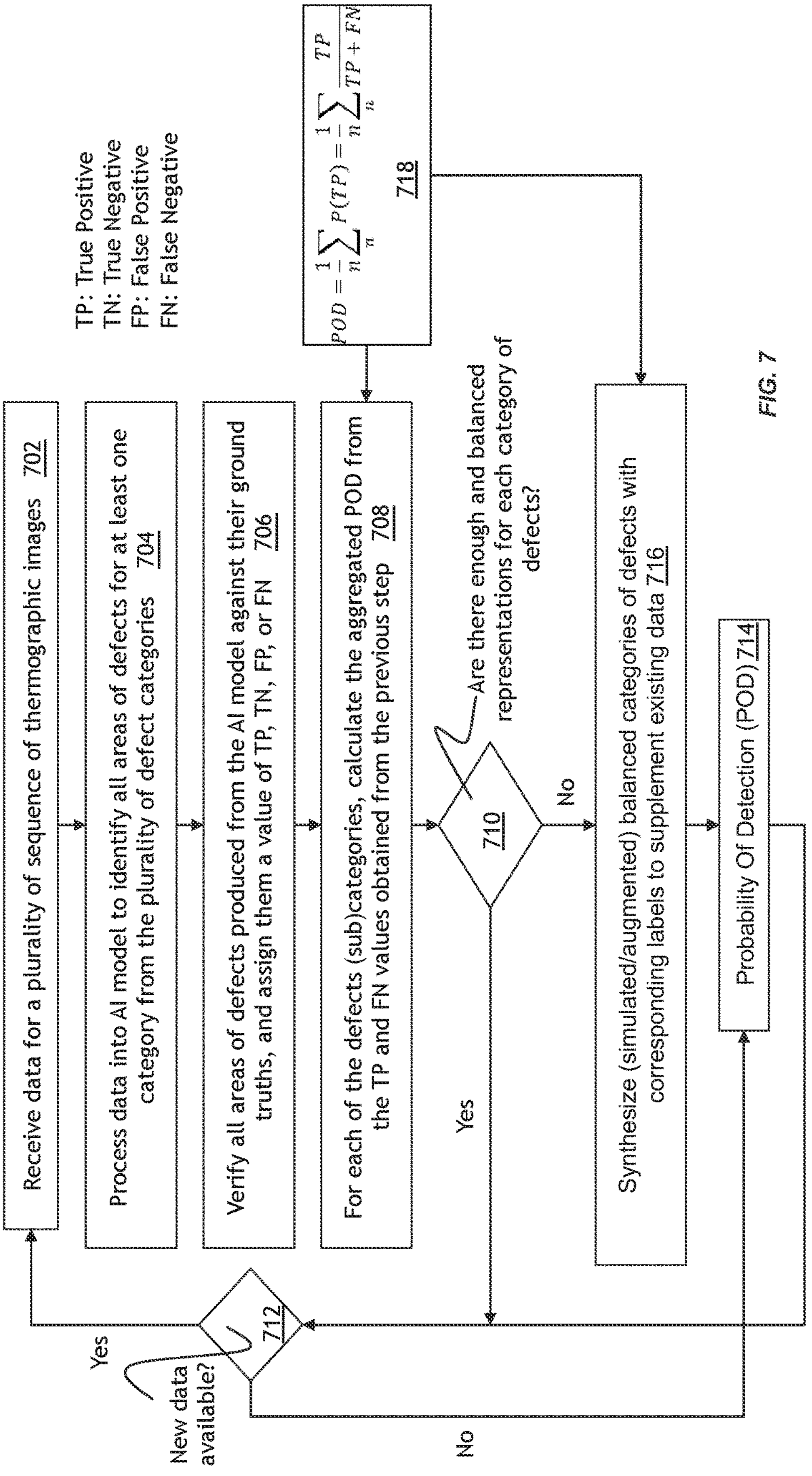
FIG. 7 is a flow diagram showing the derivation of the probability of detection of corrosion under insulation at a given condition monitoring location.

Turning now to FIG. 7, a flow diagram showing the derivation of the probability of detection of potential corrosion under insulation at a given condition monitoring location is described. At step 702, data is received for a plurality of thermographic images that are received concerning a given CML location. For instance, IR images 101 can comprise the thermographic images which are captured over a sequence of time. In order to derive the probability of detection, however, the data that is under analysis might have to be augmented because there sometimes is a scarcity of data on real defects which can impair the POD computation from being immediately feasible. To account for this, consistent with certain implementations of the present disclosure, field data is augmented using simulation data to compensate for the lack of data availability. As a consequence, POD curves can be calculated for a given category of defect.

Figure 8:
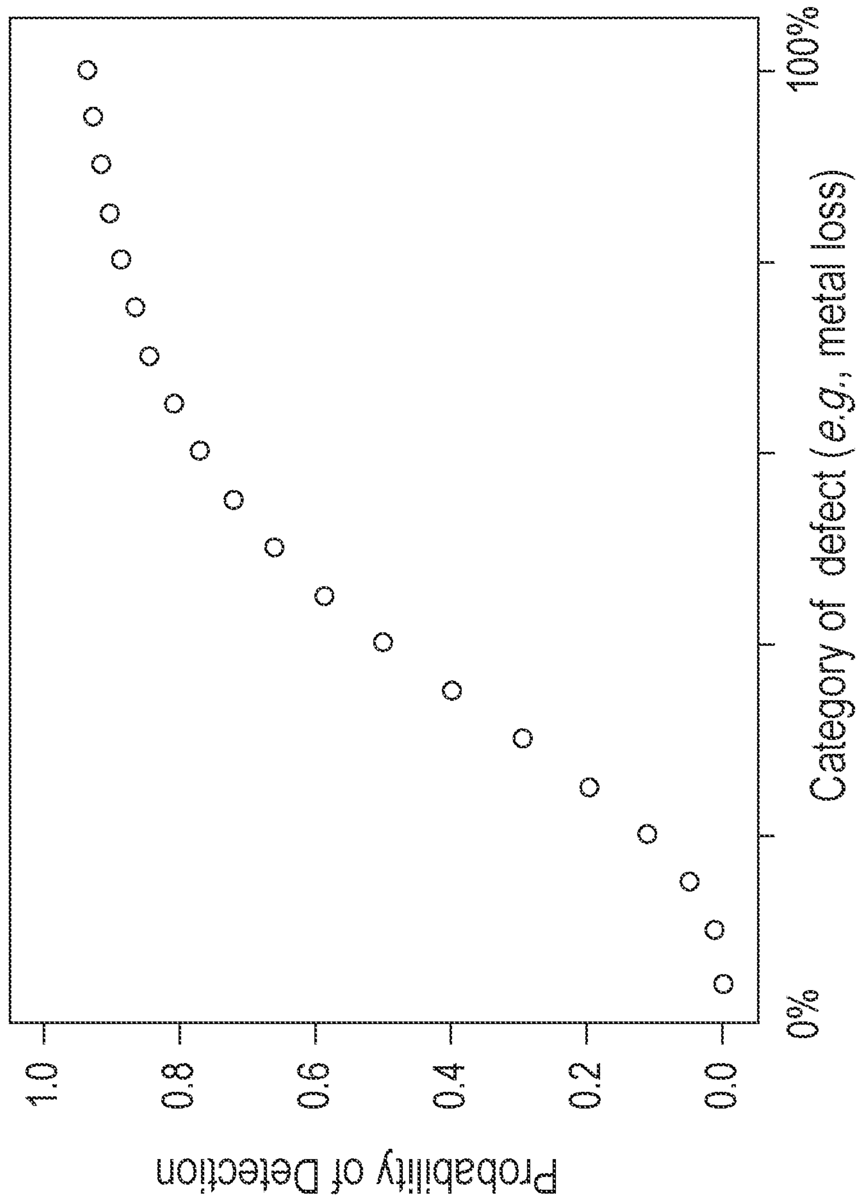
FIG. 8 illustrates an example of a probability of detection of corrosion under insulation curve.

FIG. 8 illustrates a POD curve for the category of metal loss, which is one effect that corrosion has on metal pipes and structures. Curves such as shown in FIG. 8 are calculated under a given set of experimental conditions, and each data point of the curve is computed for multiple real and augmented (simulated) data for a given severity of a class of defect and plotted along the x-axis, such as metal loss in this example. The set of experimental conditions for a given curve can include the defect type/category (metal loss), product temperature, environmental parameters, and the other parameters described hereinabove.

Figure 9:
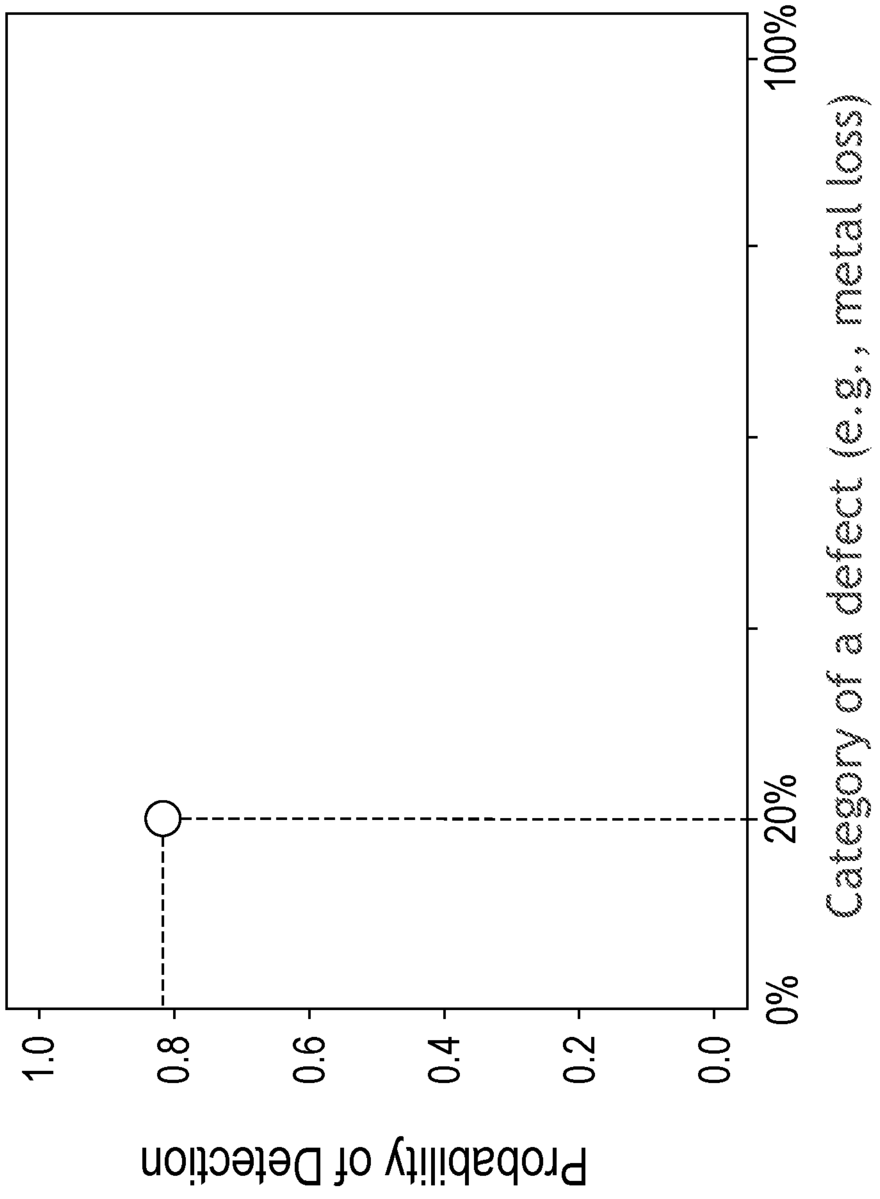
FIG. 9 illustrates a probability of detection graph showing the AI model's computation of the probability of detection for one category of defect.

In FIG. 9, a POD graph showing the AI model's computation of the probability of detection for a subcategory of defect is illustrated. For a given anomaly under consideration (here, metal loss), a dataset consisting only of anomalies with 20% metal losses is shown in this example after a review of 805 cases out of 1000 cases in the dataset. For a given anomaly (#) such as "20% metal loss," the POD is the fraction of the instances of # that are successfully found by the AI model as per the POD definition for one type of defect being examined:

$$PoD = P(TP) = \frac{TP}{TP+FN}$$

where TP refers to the count of True Positive determinations, FN refers to the count of False Negative determinations.

Figure 10:
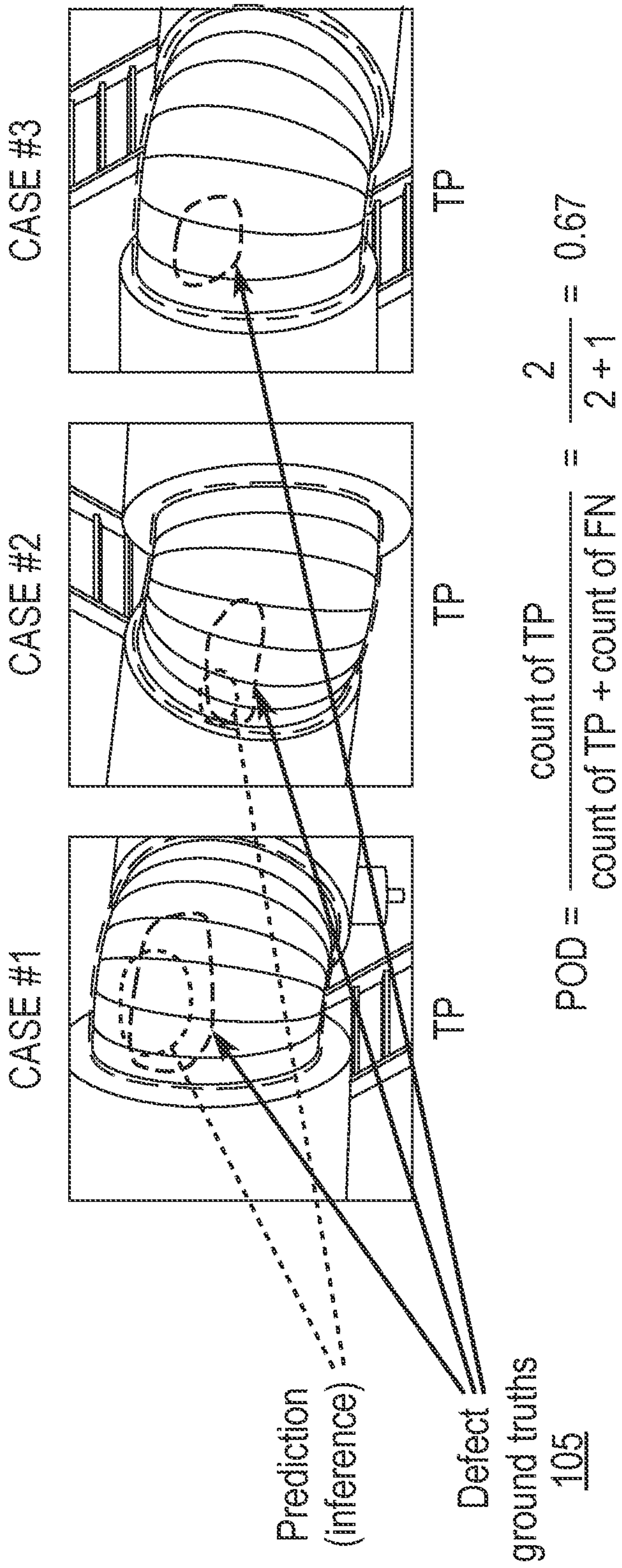
FIG. 10 illustrates an example of a probability of detection (POD) calculation for a category of defect for which there are three data points.

FIG. 10 shows a simplified example of a POD calculation for a (sub)category of defect for which there are three data points. In this example, there are two predicted defects inferred by the AI model as being encompassed by the three ground truth areas 105 under review for verification, and so in Case #3, there being no predicted defect, the count of true positives is 2. On the other hand, the ground truth data indicates a count of 3. Putting this information into the formula above results in a POD computation of 67% for this particular scenario with a very limited number of data points used during the verification stage. Of course, the higher the number of field data points, with corresponding ground truths used, the higher representation this KPI will carry. Given a DPCUI outcome, the objective of this KPI is to build and compound the POD calculations, leading to a reliable and indicative performance metric of the machine learning algorithm (AI model) in assisting in the decision making on whether to strip, verify, and repair a given CML or not.

The POD curves described herein are computed from datasets that can comprise real and actual inspections in which anomalies are verified by SMEs by stripping assets and verifying the existence and details of an anomaly (see FIG. 1B; element 105B). POD curves also can be computed using simulated/augmented and balanced categories of defects with corresponding labels to supplement the existing real data that has been acquired and verified.

Turning again to FIG. 7, at step 704 the AI model is provided with data to process in order to identify all areas of defects for at least one category, or subcategory, of defects among the various defect categories that are available for processing, such as, for example, the metal loss category illustrated in FIGS. 8 and 9. As described previously, the AI model 103 learns from annotated data provided to it to distinguish between ground truth data with verified defects and no defects and detected defects or not such as by reviewing changes in thermographic images collected over time. Thus, at step 706, the AI model is verified against all areas produced by the model against their ground truths and assigns values corresponding to whether the defect is computed as being a true positive ("TP"), a true negative, a false positive or a false negative ("FN"). At step 708, for each of the defect (sub)categories, an aggregated POD is calculated from the TP and FN values just obtained. Thus, an aggregated POD can be calculated for a variety of categories such as the healthy asset, moisture accumulation, an insulation damage, a metal corrosion, and for subcategories for each class of defect, such as, for example, levels of metal loss and/or severe corrosion categories mentioned above.

At step 710, the system tests via suitably configured code executing in the hardware processor whether the data under consideration is sufficient and has balanced representations for each category of defects. The data under consideration is considered sufficient if enough assets with representation of all the (sub)categories are directly identified in the field. The data under consideration is a balanced representation for the (sub)category if enough representation is directly identified in the field. While reasonable minds can differ as to what is sufficient in these contexts, it is better to have multiple representations in each of the subcategories and the threshold for each of the sufficient and balanced values can be prescribed by the system administrator for a given facility, asset, and category/subcategory. In the event that the data is sufficient and balanced, the process proceeds to step 712 where the processor determines under control of the executing code whether there is any new data available for review by the AI module. If that is true, then the flow loops back to step 702 to process the new data. If there is no further data to be processed, then the flow continues step 714 where an overall $POD_n$ is computed using the set of aggregated PODs for the different (sub)categories that were just processed. After that, the system loops back to step 712 so that it is ready to process any new data and update the overall $POD_n$ computation, as needed.

Figure 11:
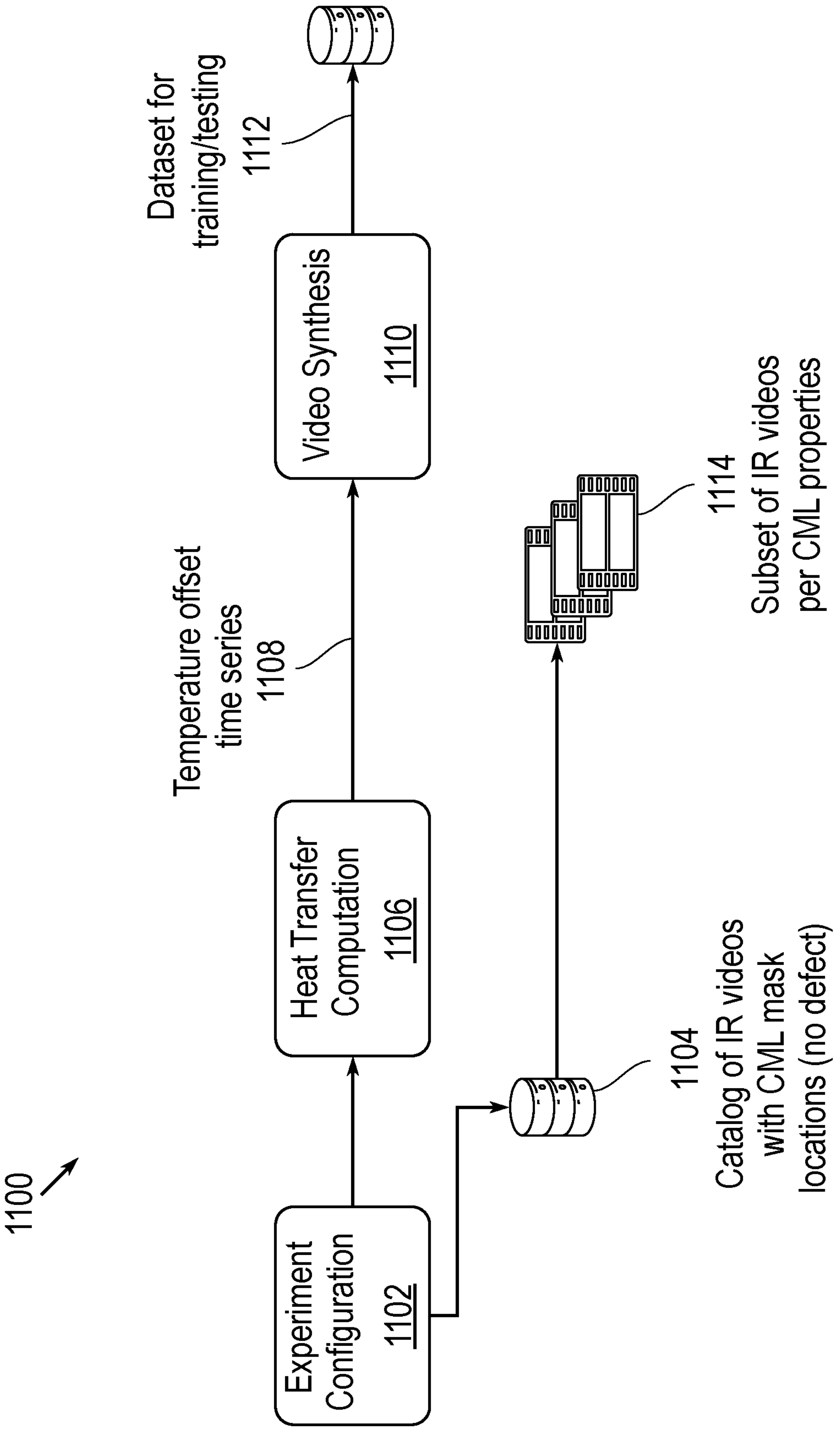
FIG. 11 illustrates a schematic arrangement of a dataset generation system that can be utilized in connection with one or more embodiments of the present disclosure.

In accordance with a salient aspect of the present disclosure, at step 710, in the event that the data determined to not be sufficient or balanced, the process proceeds to step 716 where the processor performs a further step of synthesizing using simulated/augmented data balanced categories of defects with corresponding defect type labels only to supplement the existing real data, under control of code executing therein. Once more real data become available that is considered enough and balanced, this synthetic data is then removed from the POD calculations. In FIG. 11, a schematic arrangement of a dataset generation system is provided in which data is generated using a simulator to better ensure that POD determinations can be made in regard to sufficient and balanced data under review. The dataset generation system can comprise its own hardware processor and code executing therein, or can be part of the system(s) that implement methods described in connection with FIGS. 3 and 7. The system 1100 includes an experiment configuration 1102 which can include, among other configuration parameters, environmental parameters concerning the location of the industrial asset being analyzed, the type of condition monitoring location under review, the category or subcategory of defect, and the actual data that had been acquired, such as a set of thermographic IR images. These configurations are included together within a catalog of IR videos of actual captured data which include CML mask locations which have no defect, which are stored in a database 1104. The system 1100 is configured by the code executing in the processor to perform a computation at 1106 using known thermodynamic equations operating on the experiment's configuration from block 1102. There can be a temperature offset time series 1108, such as determined by the heat transfer thermodynamic computations from block 1106. The heat transfer computation and the temperature offset time series are used to compute synthetic data points which are then fed into a video synthesis module 1110. The video synthesis module develops the synthetic data to augment the real data with no defects by providing further datasets that are stored in database 1112 for the AI model 103 to use for augmented training and testing, and POD calculations. The video synthesis module also receives a subset of IR videos 1114 in accordance with CML properties for like-(sub)category defects, wherein the subset of IR videos 1114 are obtained from the database 1104.

Returning to FIG. 7, regardless of whether step 716 is performed, the POD for the various labeled categories of defects is computed at step 718, using the processor configured by code executing therein, per the POD equation set forth above, namely:

$$PoD = \frac{1}{n}\sum_n P(TP) = \frac{1}{n}\sum_n \frac{TP}{TP + FN}$$

Those skilled in the art will understand that the systems, devices, and methods specifically described herein and illustrated in the accompanying drawings are non-limiting exemplary embodiments and that the scope of the present invention is defined solely by the recitations in the claims and legal equivalents thereto. The features illustrated or described in connection with one exemplary embodiment may be combined with the features of other embodiments. Such modifications and variations are intended to be included within the scope of the present disclosure. Further, in the present disclosure, like-named components of the embodiments generally have similar features, and thus within a particular embodiment each feature of each like-named component is not necessarily fully elaborated upon.

Other embodiments are within the scope and spirit of the disclosed subject matter. For example, the monitoring system described in this application can be used in oil fields that can include multiple oil wells. The monitoring system can also be used in facilities that have complex machines with multiple operational parameters that need to be altered to change the performance of the machines (e.g., power-generating turbines).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to support interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor-readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web interface through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

What is claimed is:

1. A system comprising:

an infrared camera configured to acquire one or more time-series infrared images of an industrial asset;

a computing device including at least one data processor, and a memory coupled to the at least one data processor and storing instructions, which when executed, cause the at least one data processor to perform operations comprising:

receiving data characterizing the one or more time-series infrared images of the industrial asset, determining an area of interest of the industrial asset within the one or more time-series infrared images, determining, by a machine learning algorithm, a plurality of defects associated with pixels within the area of interest, wherein each defect of the plurality of defects is determined based on pixel-wise assignment of at least one defect category selected from a plurality of defect categories for each pixel of the one or more time-series infrared images and each defect is represented by a cluster of pixels in which each pixel is assigned an identical defect category, and wherein each defect category is associated with a lifecycle of corrosion under insulation of the industrial asset, wherein the machine learning algorithm is one of a recurrent neural network (RNN), a long-short term memory network (LSTM) and a vision transformer based network; and providing the determined plurality of defects within the area of interest in the one or more time-series infrared images of the industrial asset.

2. The system of claim 1, wherein the plurality of defect categories includes a defect-free category, an insulation damage category, a moisture accumulation category, a metal corrosion category, and a deep-metal loss corrosion category, and further wherein the lifecycle of corrosion under insulation associated with each defect category includes a sequence of progressive stages of corrosion of the industrial asset.

3. The system of claim 1, wherein the instructions are further configured to cause the at least one data processor to train the machine learning algorithm by performing operations comprising:

receiving the data characterizing one or more time-series infrared images of the industrial asset acquired via an infrared camera;

annotating the one or more time-series infrared images with ground-truth annotations based on physical examination of the industrial asset; and training the machine learning algorithm based on the annotated one or more time-series infrared images.

4. The system of claim 1, wherein the instructions are further configured to cause the at least one data processor to train the machine learning algorithm by performing operations comprising:

receiving data characterizing one or more training configuration parameters associated with at least one defect category selected from the plurality of defect categories and associated with the lifecycle of corrosion under insulation of the industrial asset;

generating a plurality of defect image patches based on the data characterizing one or more training configuration parameters, the plurality of defect image patches including the defect;

overlaying one or more of the defect image patches onto defect-free time-series image data of the industrial asset, the defect-free time-series image data devoid of any defects of the industrial asset;

generating time-series image training data based on the overlaying, wherein the generated time-series image training data comprises ground-truth annotations corresponding to one or more defect categories, the ground-truth annotations determined based on the one or more training configuration parameters; and training the machine learning algorithm using the generated time-series image training data.

5. The system of claim 1, wherein the instructions are further configured to cause the at least one data processor to train the machine learning algorithm by performing operations comprising:

receiving field-originated time-series infrared images of the industrial asset acquired via an infrared camera and annotated with ground-truth annotations based on physical examination of the industrial asset;

receiving time-series image training data generated based on overlaying one or more defect image patches onto defect-free time-series image data of the industrial asset, the defect-free time-series image data devoid of any defects of the industrial asset, wherein the time-series image training data comprises ground-truth annotations corresponding to one or more defect categories; and training the machine learning algorithm based on a combined training dataset including the field-originated time-series infrared images and the generated time-series image training data.

6. The system of claim 4, wherein the data characterizing one or more training configuration parameters further include a surface temperature associated with the industrial asset, a temperature of a fluid within the industrial asset, a type of defect, a size of a defect, a shape of a defect, a depth of a defect, a location of a defect, a metal thickness of the industrial asset, a metal type of the industrial asset, or a thickness of the insulation.

7. The system of claim 4, wherein the data characterizing one or more training configuration parameters includes a defect depth or a defect size, and generating the plurality of defect image patches further comprises:

determining, using a first physical model of temperature propagation through a cross-section of the industrial asset, at least one temperature profile of the industrial asset;

generating, based on the defect depth or the defect size and the determining a surface temperature for each pixel included in the plurality of detect image patches; and providing the surface temperature for each pixel in the plurality of defect image patches, wherein the surface temperature is provided in the plurality of defect image patches as a cross-sectional view of the industrial asset.

8. The system of claim 4, wherein the data characterizing one or more training configuration parameters includes a defect location corresponding to a corrosion origination point, and generating the plurality of defect image patches further comprises:

determining, using a second physical model of temperature propagation across a surface of the industrial asset, at least one surface temperature profile of the industrial asset;

generating, based on the defect location and the determining, a surface temperature distribution within the plurality of defect image patches; and providing the surface temperature distribution in the plurality of defect image patches, wherein the surface temperature distribution extends across the surface of the industrial asset from the defect location corresponding to the corrosion origination point toward edges of the plurality of defect image patches.

9. The system of claim 8, wherein generating the plurality of defect image patches further comprises applying a camera noise model corresponding to the infrared camera to the plurality of defect image patches.

* * * * *